(No Model.) 2 Sheets—Sheet 1.

A. W. ADAMS.
ELECTRIC MOTOR FOR RAILWAY CARS.

No. 300,828. Patented June 24, 1884.

Witnesses:
Ewell Atrick
J. Walter Blandford

Inventor:
A. Wellington Adams
by Marcellus Bailey
Atty.

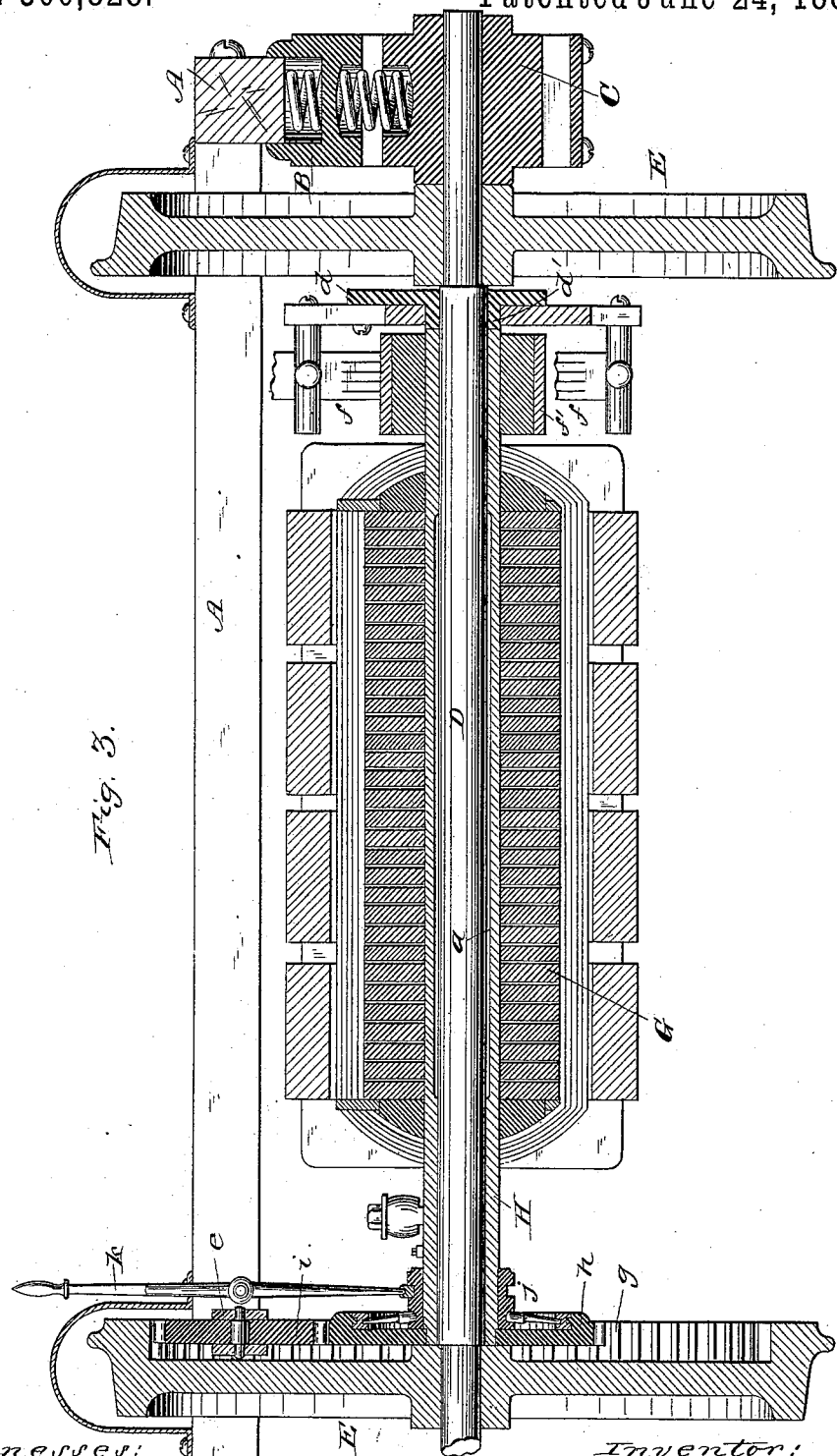

UNITED STATES PATENT OFFICE.

A. WELLINGTON ADAMS, OF ST. LOUIS, MISSOURI, ASSIGNOR TO THE ADAMS ELECTRIC COMPANY, OF SAME PLACE.

ELECTRIC MOTOR FOR RAILWAY-CARS.

SPECIFICATION forming part of Letters Patent No. 300,828, dated June 24, 1884.

Application filed December 15, 1883. (No model.)

*To all whom it may concern:*

Be it known that I, A. WELLINGTON ADAMS, of St. Louis, in the State of Missouri, have invented a certain new and useful Improvement in Electric Motors for Railway-Cars and Analogous Purposes, of which the following is a specification.

It is my object to provide an arrangement by which the field and rotating armature of an electric motor and the gearing or transmitting devices, through which motion is communicated from the armature to the wheels of the car or vehicle, can be supported in such manner as to be independent of the body of the car, with a view to permitting the latter to move freely without disturbing the relations of the motor and transmitting devices to the driven wheel or wheels. To this end I mount the armature upon the axle of the driven wheel or wheels, and I support the field in a frame, which is rigidly secured to or formed in one with the axle-boxes or journal-boxes of said wheels, said frame also carrying the intermediate gearing, through which the armature is connected to the wheel or wheels to be driven. In this way the field and all other parts carried by the frame always occupy the same relative position to the wheels and armature, and are not affected or disturbed by the spring-connection between the body of the car or truck and the wheels.

The nature of my improvement and the manner in which the same is or may be carried into effect can best be explained and understood by reference to the accompanying drawings, in which—

Figure 1:
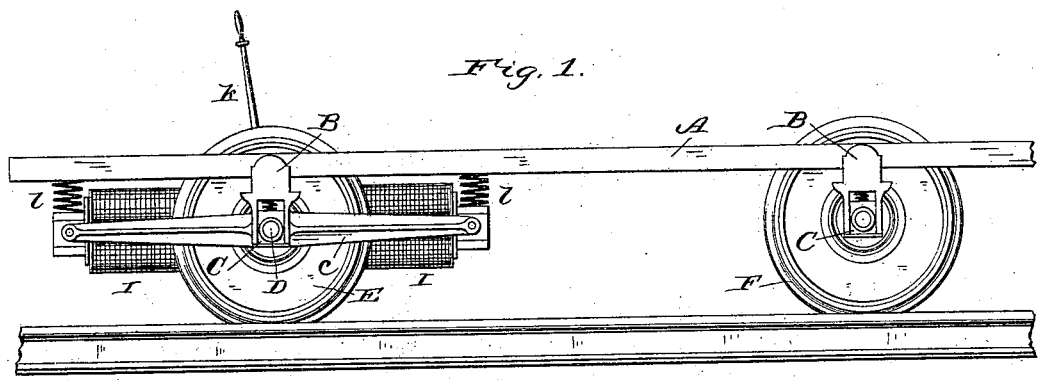
Figure 2:
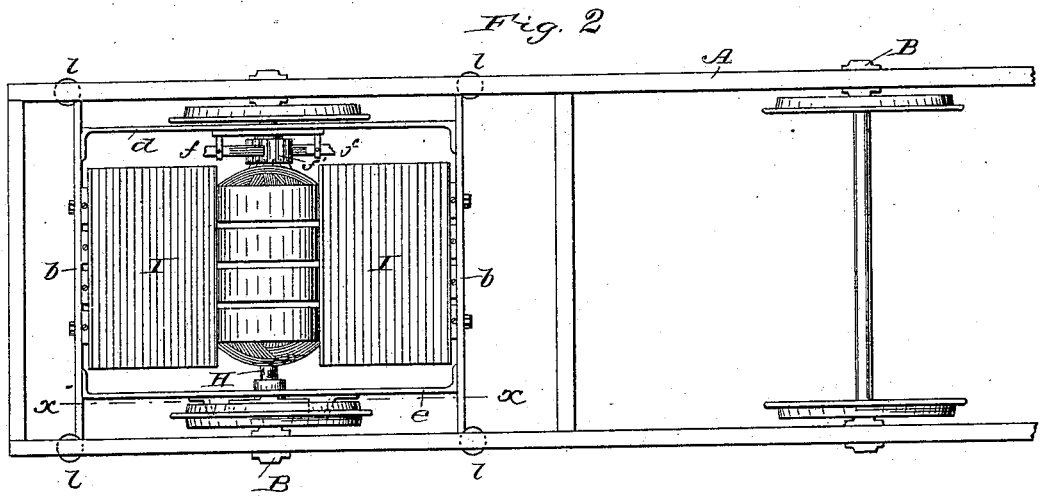
Figure 4:
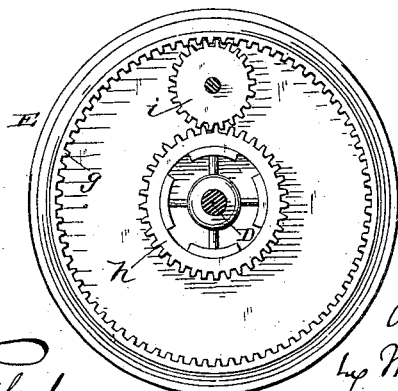

Figure 1 is a side elevation, and Fig. 2 is a plan, of so much of a railway-car truck as needed for purposes of explanation. Fig. 3 is a cross-section on enlarged scale, taken axially through the car-axle on which the armature is mounted. Fig. 4 is a section on $x\,x$, Fig. 2, representing the driven car-wheel and gearing by which the same is actuated.

In Fig. 2 the clutch mechanism is omitted, in order not to obscure the other parts.

A represents a portion of the frame of the body of the truck or car, which takes a spring-bearing in the box-frames B of the axle-boxes C in the usual way.

The car-axles are represented at D, and the wheels secured thereon are shown at E F. The wheels E in this case are the driven wheels, and their axle D carries the armature G of the electric motor. This armature is fast upon a sleeve, H, mounted to revolve on the axle, and formed between its ends with an oil-chamber, $a$, supplied with a suitable lubricant. The field-magnets of the motor are represented at I. They are fast to the cross-bars $b$ of a frame, whose side bars, $c$, are rigidly secured to, or formed in one with, the axle-boxes C of the axle of the driven wheels E. Between the cross-bars $b$ extend, on either side of the motor and in the space between the wheels, auxiliary bars $d$ and $e$. Bar $d$, at the point where it crosses the axle, has a sleeve, $d'$, which encircles the axle and forms a supporting-hub, on which the commutator-brushes $f$ of the motor are mounted, and can be adjusted to operate in conjunction with the commutator $f'$ of the armature in the customary way. The motor through the brushes is connected, as usual, with the generator or source of electrical energy. The manner of connecting being well known, requires no explanation here. The other auxiliary bar, $e$, is intended to carry the intermediate driving-gearing. One of the car-wheels E is provided with an internal gear, $g$, formed on or secured to the wheel at or near the tire. On the revolving armature-carrying sleeve H is spur-wheel $h$ and intermediate between $h$ and $g$ is a floating pinion or spur-wheel, $i$, of paper, wood, or other suitable material, attached to and supported in bar $e$, and meshing with both $h$ and $g$. Under this arrangement, when the armature-gear $h$ is in revolution, motion will be imparted from it to the wheel E through the intermediate pinion, $i$, with the result of revolving the wheels E and their axle in a direction opposite to that in which the armature moves.

With a view to stopping or starting the car at will, the gear $h$ is loose on sleeve H, and is connected with and disconnected therefrom at pleasure by means of a friction or other clutch, $j$, of known type, controlled by the driver or engineer through the instrumentality of a lever-handle, $k$, or other device suitable for the purpose.

With a view to preventing injurious thrusts of or upon the field-supporting frame, I prefer to interpose between its ends and the body A springs $l$.

Under the arrangement described it will be seen that the field of the motor, although it does not revolve, is in effect carried directly by the wheels and their bearings, and retains the same relative position at all times with respect to the same, so that motions of the body of the car on its springs will not complicate or interfere with the transmission of power from the motor to the wheels.

What I claim herein as new and of my own invention is as follows:

1. The combination, with the axle which carries the driven wheels, the axle boxes or bearings, and a frame secured to or formed in one with said boxes or bearings, of an electric motor whose armature is mounted to revolve on said axle, and whose field is attached to and carried by said frame, substantially as and for the purposes hereinbefore set forth.

2. The combination, with the driven wheels, their axle and axle boxes or bearings, and a field-supporting frame secured to or formed in one with said boxes or bearings, of an electric motor whose armature and field are carried by said axle and frame, respectively, and intermediate motion-transmitting gearing, also carried by said frame, and meshing on the one hand with a gear on the driven wheels and on the other with a gear on the armature-hub.

3. The driven wheels, their axle and axle boxes or bearings, and the supporting-frame secured to or formed in one with said boxes or bearings, in combination with the armature mounted to revolve on said axle, and the field-magnets, commutator-brushes, and intermediate motion-transmitting gearing mounted in and carried by said supporting-frame, under the arrangement and for operation as hereinbefore set forth.

In testimony whereof I have hereunto set my hand this 21st day of November, 1883.

A. WELLINGTON ADAMS.

Witnesses:
 A. P. ADAMS,
 F. E. NIPHER.